(12) United States Patent
Nikkanen

(10) Patent No.: US 8,941,755 B2
(45) Date of Patent: Jan. 27, 2015

(54) IMAGE PROCESSING DEVICE WITH AUTOMATIC WHITE BALANCE

(75) Inventor: Jarno Nikkanen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/991,194

(22) PCT Filed: Aug. 28, 2006

(86) PCT No.: PCT/IB2006/052971
§ 371 (c)(1),
(2), (4) Date: Aug. 3, 2009

(87) PCT Pub. No.: WO2007/026303
PCT Pub. Date: Mar. 8, 2007

(65) Prior Publication Data
US 2009/0295938 A1    Dec. 3, 2009

(51) Int. Cl.
*H04N 9/73* (2006.01)
*H04N 1/60* (2006.01)

(52) U.S. Cl.
CPC ............. *H04N 1/6027* (2013.01); *H04N 9/735* (2013.01)
USPC .................. 348/223.1; 348/222.1; 348/225.1; 348/234

(58) Field of Classification Search
USPC ........ 348/222.1, 223.1, 225.1, 234, 241–247, 348/251, 253–256
See application file for complete search history.

(56) References Cited

U.S. PATENT DOCUMENTS

| | | | |
|---|---|---|---|
| 5,589,879 A | 12/1996 | Saito et al. | 348/223 |
| 5,805,217 A | 9/1998 | Lu et al. | 348/273 |
| 6,421,083 B1 | 7/2002 | Takakura | 348/223 |
| 6,727,942 B1 | 4/2004 | Miyano | 348/223.1 |
| 6,801,365 B2 | 10/2004 | Nakamura et al. | 359/649 |
| 2002/0131635 A1 | 9/2002 | Cooper | 382/167 |
| 2002/0167596 A1 | 11/2002 | Suzuki et al. | 348/223.1 |
| 2003/0222992 A1* | 12/2003 | Kaplinsky et al. | 348/223.1 |
| 2004/0085458 A1 | 5/2004 | Yanof et al. | 348/223.1 |
| 2004/0141087 A1 | 7/2004 | Oda et al. | 348/340 |
| 2004/0165094 A1* | 8/2004 | Fukui | 348/333.12 |
| 2004/0212691 A1* | 10/2004 | Sato | 348/223.1 |
| 2005/0134702 A1 | 6/2005 | Subbotin | 348/223.1 |
| 2005/0213128 A1* | 9/2005 | Imai et al. | 358/1.9 |
| 2005/0286097 A1* | 12/2005 | Hung et al. | 358/509 |
| 2006/0082676 A1* | 4/2006 | Jenkins et al. | 348/362 |
| 2008/0094515 A1 | 4/2008 | Gutta et al. | 348/602 |

FOREIGN PATENT DOCUMENTS

| | | |
|---|---|---|
| EP | 1 406 454 A1 | 4/2004 |
| JP | 6-284439 A | 10/1994 |
| JP | 2000-165896 A | 6/2000 |
| JP | 2002-95003 A | 3/2002 |
| JP | 2005-33332 A | 2/2005 |

* cited by examiner

*Primary Examiner* — Roberto Velez
*Assistant Examiner* — Yih-Sien Kao
(74) *Attorney, Agent, or Firm* — Harrington & Smith

(57) ABSTRACT

The purpose of the present invention is to provide sophisticated AWB technologies. According to one aspect of the present invention, there is provided a technology for adjusting a white balance of a frame of image data including a plurality of color elements. This technology is characterized by comprising: dividing the frame into a plurality of blocks including a plurality of pixel data; judging, for each of all of or a part of the blocks, whether the block is likely to be grey or not, and; deciding gains for adjusting a white balance using the blocks judged as being likely to be grey.

25 Claims, 7 Drawing Sheets

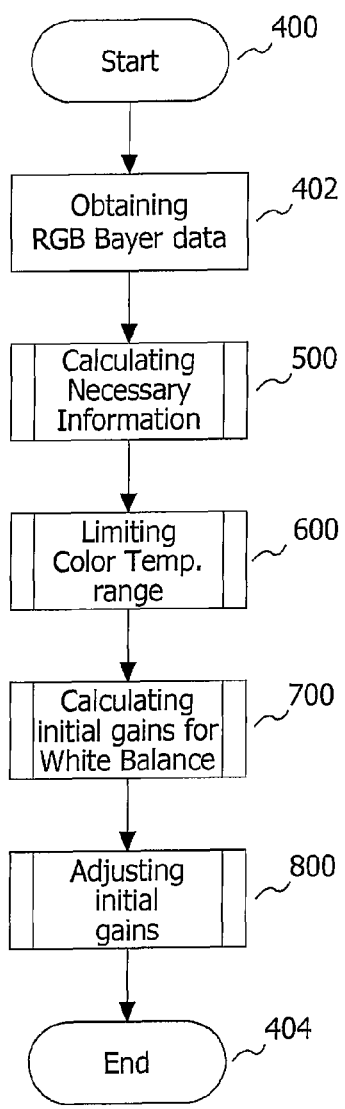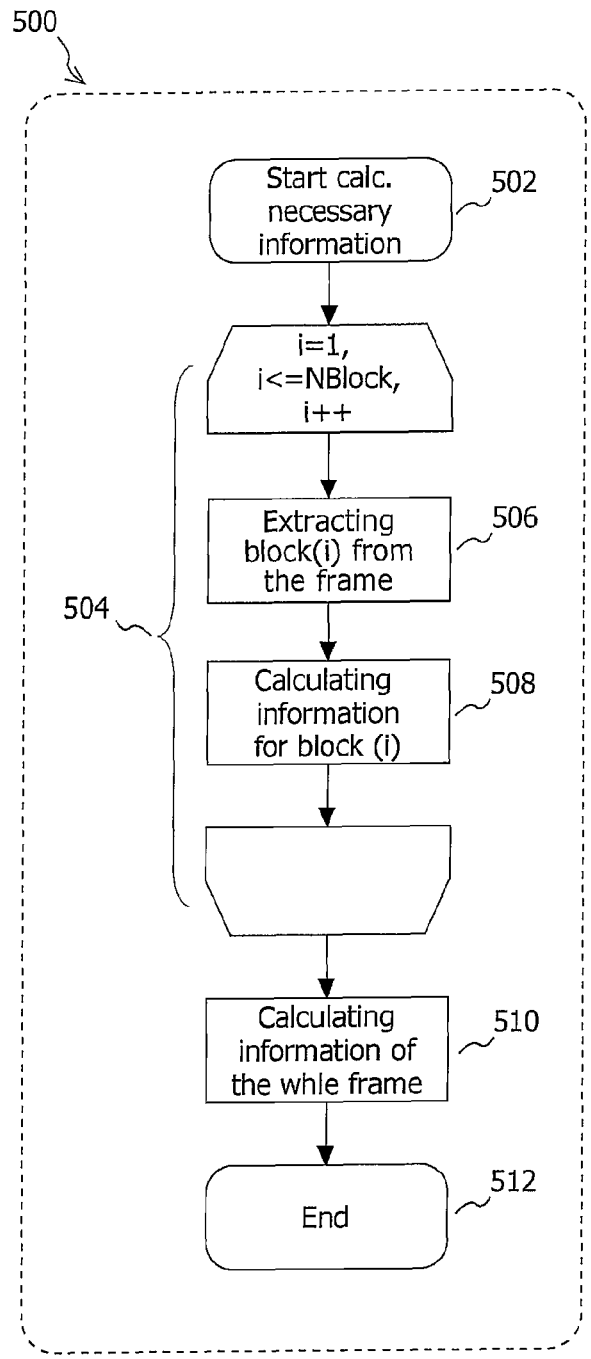
Figure 4
Figure 5

IMAGE PROCESSING DEVICE WITH AUTOMATIC WHITE BALANCE

CROSS REFERENCE TO RELATED APPLICATION

This is a national stage application of PCT Application No. PCT/IB2006/052971 filed Aug. 28, 2006, which claims priority on U.S. application Ser. No. 11/216,272 filed Aug. 30, 2005, which are hereby incorporated by reference in their entireties.

FILED OF TECHNOLOGY

The invention relates to image processing algorithms that are used in digital cameras. More accurately, the invention relates to Automatic White Balance (AWB) algorithms.

BACKGROUND

Human visual system compensates for different lighting conditions and color temperatures so that white objects can be perceived as white in most of the situations. AWB algorithms that are used in digital cameras try to do the same things for raw images that are captured by digital camera sensors. That is, AWB adjusts the gains of different color components (e.g. R, G and B) with respect to each other in order to present white objects as white, despite the color temperature differences of the image scenes or different sensitivities of the color components.

One of the existing methods of the AWB is to calculate averages for all of color components, and then apply an appropriate gain for each color component so that those averages become equal for each other. These types of methods are often called "grey world" AWB algorithms.

SUMMARY OF THE INVENTION

The purpose of the present invention is to provide sophisticated AWB technologies.

According to one aspect of the present invention, there is provided a technology for adjusting a white balance of a frame of image data including a plurality of color elements. This technology is characterized by comprising:
dividing the frame into a plurality of blocks including a plurality of pixel data;
judging, for each of all of or a part of the blocks, whether the block is likely to be grey or not, and;
deciding gains for adjusting a white balance using the blocks judged as being likely to be grey.

In one embodiment, it can be arranged to check each of all of or a part of the blocks whether the block contains a saturated pixel or not, and to exclude the block containing a saturated pixel from calculations for deciding the gains for adjusting a white balance.

In the context of the present patent application "white" is used as a synonym for "grey" and is not used to refer to a saturated value, unless explicitly stated otherwise.

In one embodiment, said technology can be arranged:
to cumulate, for each of the color elements, average values of the blocks judged as being likely to be grey;
to define a plurality of intensity ranges;
for each of the intensity ranges, to judge whether the blocks are likely to be grey in the intensity range and to cumulate, for each of the color elements, average values of the blocks judged as being likely to be grey in the intensity range;
for each of the color elements, to mix the cumulated values or the values created from the cumulated values obtained from the different intensity ranges respectively, and;
to decide the gains for adjusting a white balance based on the mixed values.

In one embodiment, said technology can be arranged to define one or more color temperatures for the grey judgement, and to judge whether the block is likely to be grey or not in the defined color temperatures.

Color temperatures may be defined based on one or more of the following measures; a measure regarding a difference of histograms between the different color elements, a measure regarding a variance of a hue histogram, a measure regarding averages of the respective color elements obtained from the blocks that do not contain any saturated pixels, and a measure regarding averages of the respective color elements obtained from the blocks having larger intensity. If there is characteristic data regarding the response of a sensor for different illuminant colour temperatures, said technology can be arranged to calculate a deviance between the characteristic data at the defined color temperature and averages values of the respective color elements in the block and to judge that the block is likely to be grey when the deviance is less than a predetermined value.

Those technology can be implemented various way, e.g., a digital camera system such as a dedicated camera device or an imaging phone, an electronic circuit such as in IC chip, a computer program or a method.

According to another aspect of the present invention, there is provided a digital camera system being capable of taking a frame of image data comprising a plurality of color elements, the system being arranged:
to divide the frame image data into a plurality of blocks including a plurality of pixel data;
to calculate a predetermined value for the each color element and for each of all or a part of the plurality of blocks;
to judge, for each of all or a part of the plurality of blocks, whether the block being likely a part of a grey (white) object or not;
to cumulate the predetermined values of the blocks judged as being likely a part of a grey (white) object for the respective color elements, and;
to decide a first set of digital gains for adjusting white balance based on the cumulated values.

According to still further aspect of the present invention, there is provided an electric circuit for processing a frame of image data comprising a plurality of color elements, wherein the said circuit comprising:
a block extractor extracting a block of the image data, the block including a plurality of pixel data;
an average calculator calculating average values of each color component of the extracted block;
a judging unit judging whether the block being potentially white or not;
a cumulator cumulating, for the respective color elements, the average values of a plurality of the extracted blocks whose color being judged as potentially white, and;
a decision unit deciding a set of digital gains for adjusting white balance based on the cumulated values.

Further features and advantages of the aspects of the present invention will be described by using exemplary embodiments. And some preferred embodiments are described in the accompanying claims. Please note that the present invention includes any advantageous features or their combinations described in this specification, accompanying claims and accompanying drawings.

BRIEF DESCRIPTION OF THE DRAWINGS

Embodiments of the present invention will now be described by way of example only and with reference to accompanying drawings in which:

FIG. 4 is an overview of the AWB processing flow according to the second embodiment explained in the detailed description portion.

FIG. 5 is a flow chart for the processes included in step 500 illustrated in FIG. 4.

DETAILED DESCRIPTION OF THE PREFERRED EMBODIMENT

[Embodiment 1]

Figure 1:
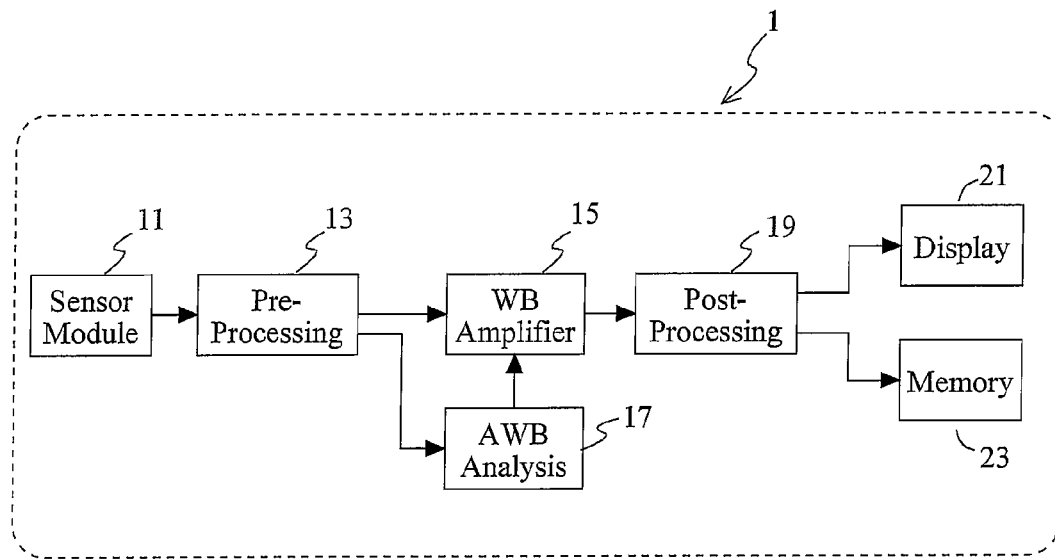
FIG. 1 is a schematic block diagram illustrating main components of a camera device according to a preferred embodiment of the first embodiment explained in the detailed description portion.

FIG. 1 is a schematic block diagram illustrating main components of a camera device according to a first preferred embodiment of the present invention herein explained. The camera device 1 comprises a sensor module 11, a pre-processing circuit 13, a white balance (WB) amplifier 15, an auto white balance (AWB) analyzer 17, a post-processing circuit 19, a display 21, and a memory 23. The sensor module 11 can be used for generate images for viewfinder and take still pictures or videos. The sensor module 11 comprises a lens, an image sensor with a RGB Bayer color filter, an analog amplifier, an A/D converter, and convents an incident light into a digital signal. This digital signal can be called as a Raw data, and has a RGB Bayer format i.e., each 2×2 pixel block comprises two Green data, one Red data, and one Blue data. In another embodiment the color filter may be a CMY Bayer filter. In the other embodiments, the sensor module 11 may not use a Bayer color filter, but comprises a Foveon-type sensor i.e. the sensor which records image signals of different wavelengths in different depths within the silicon. The sensor module 11 may also comprises actuators for auto-focus and zoom and aperture control and ND-filter control.

The pre-processing circuit 13 may perform e.g. noise reduction, pixel linearization, and shading compensation. The WB amplifier 15 adjusts the gains of different color components (i.e. R, G and B) with respect to each other in order to make white objects white. The amount of gains are decided by the AWB analyzer 17. The AWB analyzer 17 analyzes the raw data to calculate the amount of gaining, and set the digital gains of the WB amplifier 15 according to the result of the calculation. In addition to color balance, the AWB analyzer 17 may also include overall digital gain part in the WB gains to increase image brightness and contrast by stretching adaptively the histograms towards the bright end.

The AWB analyzer 17 may also calculate R, G and B offsets to increase the image contrast by stretching adaptively the histograms towards the dark end. Those offsets should be taken into account in the white balance gains, and they can be applied to data prior to or after WB gaining. The AWB analyzer 17 may also calculate an amount and shape of non-linear correction, which may be applied to the image data at the post-processing circuit 19.

The post processing circuit 19 performs CFA (Color Filter Array) interpolation, color space conversion, gamma correction, RGB to YUV conversion, image sharpening, and so on. The post processing circuit 19 may be hardware pipelines for performing one or all of those processing, or may comprise a processor for performing those processing by software processing. The image data processed by the post processing circuit 19 may be displayed on the display 21 or stored in the memory 23. Preferably the memory 23 is a removable storage means such as a MMC card or a SD card.

Figure 2:
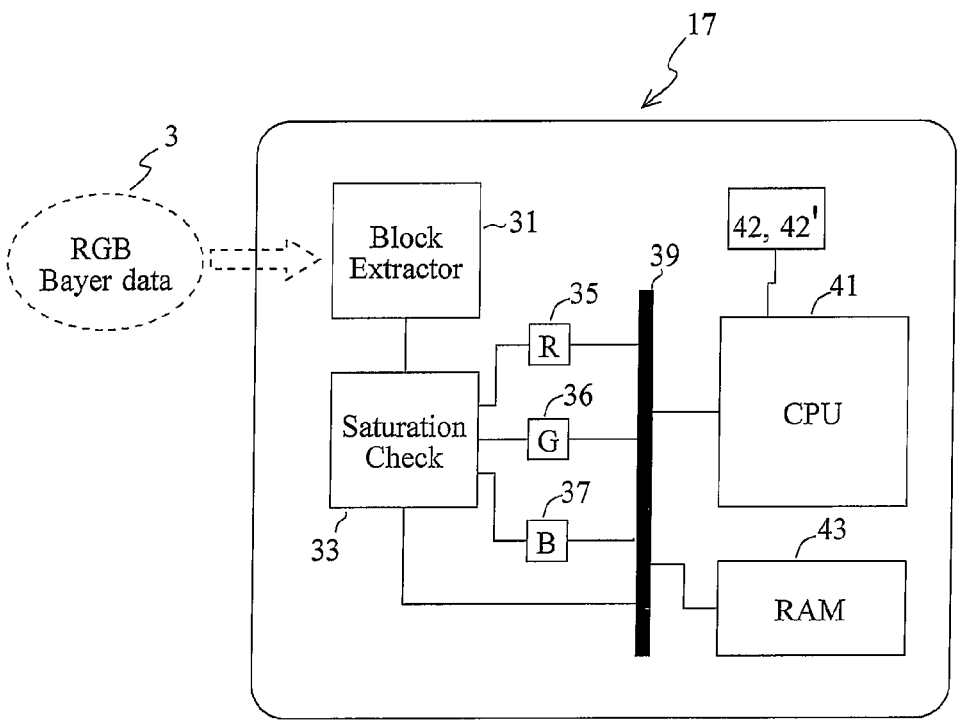
FIG. 2 is a schematic block diagram illustrating main components of the AWB analyzer 17 according to the first embodiment.

FIG. 2 is a schematic block diagram illustrating main components of the AWB analyzer 17 according to the preferred embodiment of the present invention. The AWB analyzer 17 comprises a block extractor 31, a saturation checker 33 and average calculators for Red (R) component 35, for Green (G) component 37, and for Blue (B) component 39. The AWB analyzer 17 also comprises a bus 39, a CPU 41, a firmware 42, and a RAM 43.

The block extractor 31 divides a frame of the raw data into small blocks, and provides the raw data to the saturation checker 33 block by block. A frame in this context means a total area of a still picture or a single picture in a series of video data. Each block contains a plurality of red, green, and blue pixel data. As an example, when the resolution of the sensor module 11 is 1.3 mega pixels, preferably the block extractor 31 is arranged to divide a frame into 72×54 blocks, which means that each block contains about 330 pixels. Of course any ways of dividing are possible as long as they meets the requirement of speed, quality, price and so on.

The saturation checker 33 is connected to the bus 39, and checks a block whether the block contains a saturated pixel or not. The saturation checker 33 also checks whether the block in process is adjacent to the other saturated block or not. This information, i.e. "the block does not contain any saturated pixels", "contains a saturated pixel", or "is adjacent to a saturated block", is sent to the CPU 41. The information may also contain a number of saturated pixels within a block. The number of saturated pixels is useful in determining how reliable the saturated block is, if saturated blocks need to be used in step 150 or step 180 in FIG. 3 (will be explained later) due to big block sizes etc.

The average calculators 35, 36, and 37 are connected to the bus 39, and calculate average values of Red components, Green components, and Blue components of the block in process respectively. If the block in process contains saturated pixels, the average calculators calculate the average values of only non-saturated pixels. The calculated average values are provided to the CPU 41 through the bus 39. The block extractor 31, the saturation checker 33 and the average calculators 35, 36, and 37 may be hardware circuits. But they can also be implemented as software processing by using a CPU. In the latter case the way of dividing may be programmable.

The CPU 41 stores the saturation information and the R, G, B respective average values for each block in the RAM 43 according to instructions of the firmware 42. The firmware 42 is software which instructs the CPU 41 to perform the necessary data processing. The CPU 41 performs further calculations to decide the amount of digital gains based on this information according to the instructions of the firmware 42.

Figure 3:
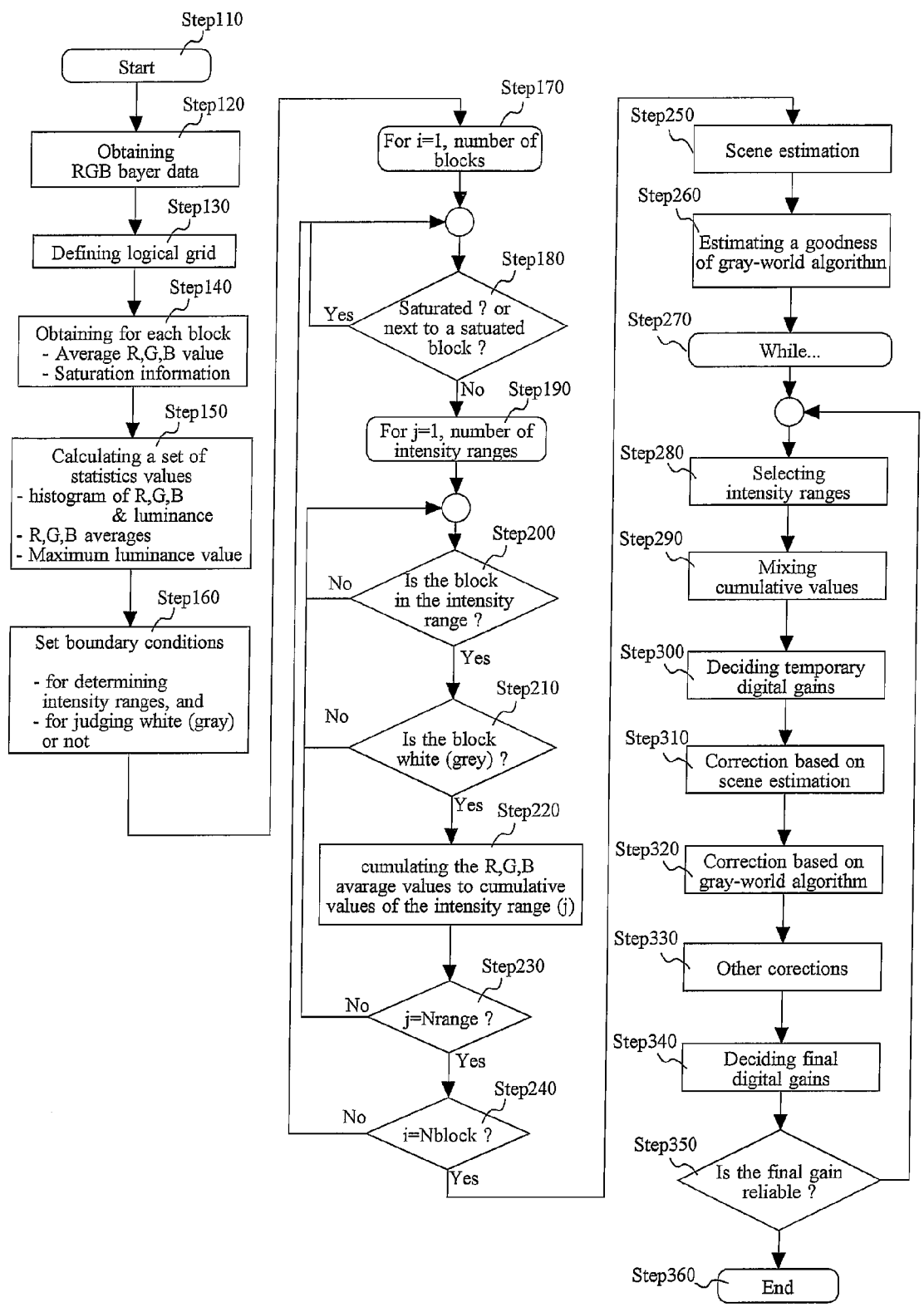
FIG. 3 is a flow chart for explaining the image processing of the AWB analyzer 17 according to the first embodiment.

Referring to FIG. 3, the image processing of the AWB analyzer 17 will be described below in detail. Step 110 shows the start of analysis. In step 120, a frame of image data to be analyzed is provided from the pre-processing module 13. As mentioned above, the image data to be analyzed in this embodiment is a Raw data with RGB Bayer format. Please note that this invention can be applied for other data format, e.g. CMY Bayer format or a data format containing the same number of color elements for all the color components, or a data format in which each pixel contains all used color components.

In step 130, the block extractor 31 divides a frame of the raw data into small blocks, and provides the raw data to the saturation checker 33 block by block. As mentioned above the frame in this embodiment means a total area of a still picture or a single picture in a series of video data. And each block contains a plurality of red, green, and blue pixel data.

In step 140, the saturation checker 33 checks each block whether the block does not contain any saturated pixels, or contains a saturated pixel, or is adjacent to a saturated block. And the average calculators 35, 36, and 37 calculate average values of Red components, Green components, and Blue components of the block in process respectively. If the block in process contains saturated pixels, the average calculators calculate the average values of only non-saturated pixels.

As the result of the step 140 processing, the AWB analyzer 17 will obtain a set of block information. The number of block information is the same as the number of blocks, and each block information contains saturation information and average values for R, G, and B components of the block. This set of block information is stored in the RAM 43.

In step 150, the CPU 41 scans, according to the instruction of the firmware 42, all of the block information, and calculates a set of statistic values for a whole frame from the block information. These statistic values include histograms of the red components, green components, blue components, and luminance of (for) the whole of the raw data in process. The luminance in this embodiment is defined by (r+2g+b)/4, where the r, g, and b represent the average values of red, green and blue component of a block. Those statistic values may also include the average values of red, green and blue components of the whole frame, and the maximum luminance value. The maximum luminance value is a luminance of the brightest block of the frame in process.

Some of these statistic values will be used to make criteria to whether it is likely that the block is part of grey object or not. Also some of these statistic values will be used to make criteria to decide intensity ranges.

If block information of a block shows that the block contains a saturated pixel, or the block is next to a saturated block, the CPU 41 excludes this block information from the calculation of these statistic values. The reason is that the saturated pixel values are not reliable, because the information about the relationship between different color components tends to be damaged. The pixels that are close to saturated pixels are not preferred too because the pixel response is very non-linear when the pixel is close to the saturation, and also because there is high possibility of electrons bleeding into neighboring pixels and increased pixel cross-talk. As the CPU 41 excludes the blocks that contain saturated pixels or blocks adjacent to such blocks, the AWB gain analysis in this embodiment is not sensitive to inclusion of saturated pixels. In another words the AWB gain analysis in this embodiment is not affected by the pixel saturations. This is one of an important advantage of this embodiment.

In another embodiment, the block information of the blocks containing a saturated pixel or the blocks adjacent to the saturated block (the block containing a saturated pixel) may be used for calculating the above statistic values. This embodiment may be beneficial when the frame is divided into relatively large blocks, e.g. the frame is divided into 12×32 blocks. In such embodiment rejecting a block would lose big area of the image. For such cases, the blocks adjacent to the saturated block or all blocks may be utilized, even they may not be reliable enough, or the averages of the non-saturated pixels within the saturated blocks may also be utilized.

In step 160, the CPU 41 sets, according to the instruction of the firmware 42, boundary conditions for determining intensity ranges of each block. For example, the CPU 41 and the firmware 42 calculates 99.8%, 80%, 50% and 25% locations for the histograms of the red component, the green component, the blue component, and the luminance obtained in step 150. The xx% location in histogram in this embodiment means that xx% of the pixels are darker than this value. After this step these values are used instead of the histograms obtained in step 150.

In step 160, the CPU 41 and the firmware 42 also set boundary conditions for the R/G, B/G, min(R,B)/G and max(R,B)/G relations that are used to judge whether a block might be grey (white) or not. Here the R, G, and B represent average values of the red, green and blue component in the block to be judged. Min(R,B)/G represents a value dividing a smaller one of the R and the B by the G, and max(R,B)/G represents a value dividing a larger one of the R and the B by the G. In one embodiment, these boundary conditions may be fixed according to known RGB response to different color temperatures, and then modified according to the sensor characteristics (e.g. different color filter characteristics between different types of camera sensors cause variation in the required limits). In another embodiment, these criteria (boundary conditions) are decided based on the statistic values obtained in step 150.

The values for boundary conditions may also be used for detecting special case lighting conditions of the image data in step 250, i.e. whether the lightning condition of the scene of the image data is such that it needs special adjustment to produce pleasing and accurate colors. Such lighting condition analysis may improve the performance of the white balancing, especially in case when there is little or no proper reference white available in the scene.

From the step 170 to step 240, the CPU 41 and the firmware 42 make judgements for the respective blocks whether color of the blocks could correspond to grey(white) object or not, and cumulate the RGB average values of the white/grey blocks. The cumulated values are used for deciding the digital gains for white balancing.

However, before the judgment and the cumulation, the CPU 41 and the firmware 42 exclude the saturated blocks and the blocks next to the saturated blocks from those operations (step 180). The reason of excluding those blocks is, as mentioned above, that they are not reliable enough. This is another reason why the AWB gain analysis in this embodiment is not sensitive to inclusion of saturated pixels. This is one of an important advantage of this embodiment. In one embodiment, if the block size were really big, then the blocks that are next to saturated blocks may not be rejected. In another embodiment, even the saturated blocks may not be rejected, and non-saturated averages of the saturated blocks may be used in the following steps for some of the special case intensity ranges, at least if the block size is relatively large.

In step 200, the CPU 41 and the firmware 42 check whether a block belongs to one or more of the intensity ranges or not. Various types of intensity ranges can be defined. For example, the intensity range C may be defined so as to cover the intensity range of the range A and the range B. Therefore a block belongs to the range A is also belongs to the range C. In general, a block can belong to the several intensity ranges.

In one embodiment, it is possible to define a first intensity range, and a second intensity range which includes the range of the first intensity range. It may be also possible to define a third intensity range which includes the range of both the first and the second intensity range. Or, an intensity range whose range is very narrow, or is sensitive for the special lighting condition, i.e. a very bright, very dark, a blue sky, clouded, tungsten and so on, may be defined.

In step 210, the CPU 41 and the firmware 42 judge whether the block in process is potentially a part of white (grey) object or not.

In one embodiment, whether a block could be grey (white) or not is determined by comparing the R, G and B average values of the block to each other, taking into account certain sensor-specific pre-gains that normalize the sensor response into e.g. 5000K color temperature. Relations between different color components that correspond to different black body radiator color temperatures can be used as a starting point for the limits, but additional variance needs to be allowed because the black body radiator does not represent accurately all possible light sources (e.g. fluorescent light sources have large variance in spectral response and some of them are not close to the black body radiator).

In the preferred embodiment, the CPU 41 and the firmware 42 define the limits for the purpose of grey (white) judgment as mentioned in step 160. In step 210 the CPU 41 and the firmware 42 checks whether R/G, B/G, min(R,B)/G and max (R,B)/G satisfy the criteria decided in step 160, and judge that the blocks satisfying those criteria as the grey or white blocks. The criteria for grey (white) judgment can be different for the each intensity range. Also those criteria can be different depend on the estimated lighting conditions. There are separate color limits for high likelihood white and lower likelihood white. Bigger weight is given to the high likelihood blocks in the cumulative values in comparison to the lower likelihood blocks.

In step 220, the CPU 41 and the firmware 42 cumulates the respective red, green, and blue average values of the blocks judged as white or grey in the intensity range in process. As shown by the loop from step 190 to step 230, the grey judgment is performed for each intensity range. And in each intensity range, the red, green and blue averages are accumulated into each variable if the block values are within the limits set in step 160. (The block values means R/G, B/G, min(R,B)/G and max(R,B)/G, see the description of step 160.)

When scanning all the blocks is finished, in step 240, a set of cumulated values of R, G, and B components will be created for each intensity range. These cumulative values are then temporarily stored in the RAM 43, and will be used to calculate the white balance gains later.

In step 250, the CPU 41 and the firmware 42 detect special cases that need additional color balance tuning in order to produce accurate and pleasing colors. For example, bright blue sky scenes can be detected and known blackbody radiator color temperature under the bright blue sky can be used together with grey blocks to determine the final color temperature. The values for determining boundary conditions obtained in step 160 will be used for identifying such special color cases. Also the total exposure that consists of exposure time and analogue gain (and digital gain if it has been applied for the raw data, and also aperture and focal length if those can be adjusted in the system) may also be utilized for identifying the special color cases. The result of the special case detection will be considered for the digital gain calculation in step 310.

An example of special case may be a blue sky. An image scene that is captured in bright daylight lighting condition and consists of bright blue sky and possibly some faint cloud haze can contain a lot of false reference white. Therefore detecting such case and considering such case in the digital gain calculation will improve the AWB performance. Other examples of the special cases are the images of candles and fireplaces. In those cases more pleasing (in this case maybe not more accurate but still more pleasing) colors can be obtained by detecting those and modifying the AWB gains.

In step 260, the CPU 41 and the firmware 42 calculate a certain goodness score of the grey-world algorithm so that also grey-world algorithm can be included in the final result if there seems to be very little reference white available and high goodness-score for the grey-world algorithm. The correction by the grey-world algorithm will be performed in step 320.

In step 290, the CPU 41 and the firmware 42 mix the cumulated values obtained from the different intensity ranges in step 170-240 for the respective color elements. So a set of R, G, and B mixed values are created in this step. In this embodiment, only a part of the intensity ranges will be used for this mixing. A set of intensity ranges used for the mixing is selected in step 280. The mixed values will be used to decide the white balance gains. For the mixing, the CPU 41 and the firmware 42 may be arranged to give a weight on a cumulated value according to how many possible white blocks have been found from its intensity range. For example, a cumulated value whose intensity range contains a lot of grey (white) blocks will be given a bigger weight at the mixing. Or, the CPU 41 and the firmware 42 may be arranged to give bigger weights for cumulated values of the specific intensity ranges. For example, as the brighter ranges are considered to be more reliable, the cumulated value of the brightest intensity range will be given the biggest weight at the mixing. Giving weight may be done in advance in step 220. If very little amount of grey blocks are found from the primary intensity range, then additional intensity ranges can be added to the cumulative values.

In step 300, the CPU 41 and the firmware 42 decide the first candidate of the white balance gains based on the set of mixed values. Gain values may be decided as the values that can equalize the R, G, and B mixed values by applying thereon.

In step 310, the mixing values obtained in step 290 may be corrected based on the color tone estimation performed in step 250 to improve the performance of the white balancing, especially in case that there is little or no proper reference white available in the scene. For example, the blue sky could be problematic if there are no clearly white clouds but some haze, because those haze could be mistook as white. This correction can improve this kind of situation. The correction may be done by mixing the cumulate values of certain intensity range into the mixing values obtained in step 290. And the candidate white balance gain will be updated based on the new mixing values. The correction in this step may not be performed if it is not necessary.

In step 320, the candidate white balance gains obtained in step 300 or 310 may be corrected by the grey-world algorithm based on the goodness calculation in step 260. The goodness score calculated in step 260 may be used to determine how big weight in the final gains is given for the results that are obtained from the grey world algorithm. If the goodness score for grey world is very high, then e.g. 80% weight is given to grey world part and 20% weight to the gain values obtained by the previous steps. Similarly, if the goodness score for grey world is not very high, then 0% weight is given to grey world and 100% to the results obtained by the previous steps.

To take account the grey world algorithm into account, the correction may be done for the mixing values obtained in step 290. As in step 310, the special cases like the bright blue sky or no white reference may be detected at first, then the mixing is done like as in step 310. The correction in this step may not be performed if it is not necessary.

In step 330, the candidate digital gains or mixed values obtained in previous steps may be adapted according to total exposure (exposure time*analogue gain) in order to give good overall image contrast in bright scenes while still maintaining low noise and good detail preservation in bright image areas in dark scenes. Also aperture, ND-filter, focal length and additional digital pre-gaining may also be considered if those parameters are variable.

The final gains may consist of combination of color balance gains and overall digital gain, i.e. colors are corrected with the gains and also luminance level. The correction in this step may not be performed if it is not necessary or if this step is not implemented in the firmware 42.

In step 340, the final set of digital gains is decided. However, the final gains are still checked whether it is reliable values or not. For example, there may be a possibility of an error if some color component seems to dominate over the other color components. In such case the firmware 42 instructs the CPU 41 to go back to step 270, and select different set of intensity ranges in step 280, and re-do the following steps. If the final gains are reliable, then the gain calculations are finished (step 360). According to the instruction of firmware 42, the CPU 41 sets the digital gains of the AWB amplifier 15 as calculated values.

The preferred embodiment has been tested in the assignee of the present invention. In this test, 248 images that have been captured in a multitude of lighting conditions are used. And the result has shown that it can improve the AWB accuracy a quite a lot. After step 360, the AWB amplifier may apply the digital gains to the frame of image data used for the gain calculation, or may apply them only to the image data of next frames, i.e. the image data taken by the next shooting. In one embodiment, the camera device 1 may comprise a frame memory which can store a whole of image data which is comprised in a complete frame. In this embodiment the same frame which is used for the white balance calculation can be corrected by the calculated gains. But in another embodiment the camera device 1 may not comprise a memory which can store a whole of frame, but a line buffer which can store only a part of a frame. In this embodiment, the AWB gaining needs to be applied to part of the frame data before the statistics for the whole image data for the frame is available for AWB analysis. Thus the result of AWB analysis from the previous frame (e.g. viewfinder frame) can be used instead. In another words the AWB analysis that is calculated on basis of frame n is used for frame n+1. In these memory-limited systems the WB gains may be applied to the lines in the beginning of the image before the whole image is available for AWB analysis block 17.

Please note that various modifications may be made without departing from the scope of the present invention. For example this invention can be applied not only for the Bayer raw data also different types of image data such as Foveon type data. The calculation of the averages and the maximum luminance value in step 150 may also be done in later step from the R, G B and luminance histograms.

[Embodiment 2]

Another example of a preferred embodiment of the present invention, which will be called Embodiment 2, will be explained below with reference to attached figures and especially FIGS. 4 to 8. The hardware configuration of Embodiment 2 is the same as the embodiment explained above, which will be called Embodiment 1 hereinafter. So the same hardware names will be used with the same reference numbers for Embodiment 2 and Embodiment 1. However, the firmware software of Embodiment 2, that is used to control CPU 41, is different from the firmware of Embodiment 1. So, to express this difference, the reference number 42' will be used for indicating the firmware of Embodiment 2 instead of 42 which was used for the firmware of Embodiment 1. The difference in the AWB calculations between Embodiment 1 and Embodiment 2 are caused by the difference of firmware 42 and 42'.

FIG. 4 illustrates an overview of the processing flow for obtaining ideal white balance gains according to the Embodiment 2. Step 400 is just to indicate the start of the processes. In step 402, a frame of image data is provided to the AWB analyzer 17 like as the step 120 of the FIG. 3. As mentioned earlier the frame of image data has information to construct one complete still picture or one complete frame of a series of video data. The frame of image data may be provided from the sensor module 11 when a user of the camera device 1 takes a picture or video, or when the user previews images in a monitor of the camera device 1 to decide the picture frame composition. In another embodiment this image data may be provided from a memory to an electronic circuit having the AWB analyzer 17. As mentioned before, this image data may be acquired by a CCD sensor or a CMOS sensor having a RGB color filter. In the other embodiments this data may be taken by a photo sensor with a CMY color filter, or a Foveon sensor. Since such image data has not been constructed as a general image data that can be displayed or printed by general personal computers, generally it is called as a Raw data, as mentioned before.

Step 500 indicates the processes for calculating information which will be used for the AWB algorithm in this Embodiment. This step corresponds to step 130 to step 150 in FIG. 3, but there are differences. Details are explained later. Step 600 indicates the processes for limiting a color temperature range that will be the basis of judging whether the blocks of the frame are likely to be grey or not. Details are explained later. Step 700 indicates the processes for finding blocks in the frame that are likely to be grey and calculating initial white balance gains based on those reference grey blocks. Step 800 indicates the steps for adjusting initial gains by certain criteria to decide the final white balance gains. Step 404 indicates the end of processes. Details of steps 500-800 will be explained below.

FIG. 5 illustrates the processes included in the step 500 of the FIG. 4. Step 502 is just to indicate the start of the processes. In the loop indicated by the index 504, the image data of the frame are divided into small blocks and the necessary information is calculated for the each block. The processes in this step are the same as the step 130 and 140 in the FIG. 3. Like as the Embodiment 1 the Raw image data with RGB Bayer format are divided into small blocks that contain a plurality of red, green, and blue elements (pixel data). Dividing a frame data into a plurality of small block data can be performed by a dedicated hardware circuit like as the block extractor 31. But of course it can be performed by a software processing.

In step 506, the i-th block is extracted from the frame data. The extraction may be performed by the block extractor 31, or may be performed by the CPU 41 according to the instruction of the firmware 42'. Then in step 508 following information is calculated for the i-th block.

(i) Averages of R, G, and B pixel values in the block.
(ii) Luminance of the block. (It is defined as (R+2G+B)/4, where R, G, and B are average R, G, and B pixel values in the block respectively.)
(iii) Information whether the block contains a saturated pixel or not. (Optional)
(iv) Number of saturated pixels in the block. (Optional)

As this information is related with the individual block, hereinafter some or all of this information may be called as block information or block values. Some of the block information may be calculated by a dedicated hardware. For example, averages of R, G, and B pixel values can be obtained from the average calculators 35, 36, and 37. In another embodiment all of the block information may be calculated by the CPU 41 in accordance with the instructions of the firmware 42'.

After finishing calculation of the block information for all blocks, the process moves to the step 510. Step 510 is the step for calculating information regarding the whole frame. The following information is calculated.

(i) Averages of the block information (i) of the blocks that do not contain any saturated pixels. I.e., Average R, G, and B values of all of the blocks that do not contain any saturated pixels.
(ii) Histograms of the block information (i) and (ii) of non-saturated blocks. I.e., Histograms of R, G, and B block averages and Luminance values of all of the blocks that do not contain any saturated pixels.
(iii) Histogram percentiles in certain points for respective R, G, and B components.

For example, suppose that the resolution of the A/D converter of the sensor module 11 is 8 bit, and the histogram percentiles are calculated at 25%, 50%, 80%, and 99.8%. Then the obtained histogram percentiles may be as follows.

$$\begin{cases} P_{R25\%} = 125, & P_{R50\%} = 180, & P_{R80\%} = 210, & P_{R99.8\%} = 235, \\ P_{G25\%} = 75, & P_{G50\%} = 100, & P_{G80\%} = 120, & P_{G99.8\%} = 150, \\ P_{B25\%} = 80, & P_{B50\%} = 90, & P_{B80\%} = 100, & P_{B99.8\%} = 125, \end{cases}$$

where the histogram percentile of 25% for R component is denoted as $P_{R25\%}$, the histogram percentile of 80% for B component is denoted as $P_{B80\%}$, and so on. Of course these values are just presented as examples for better understanding of this step. Those values will vary depending on, e.g., the image data, the number of percentiles to be calculated, locations where the percentiles are calculated, the resolution of the A/D converter, and/or the number and the kind of the color components.

(iv) Average R, G, and B values of the bright blocks. For example, respective averages of the R, G, and B block values are calculated from the blocks whose intensity is more than e.g., the 90% intensity percentile. Upper limit may be employed to the blocks to be used in this calculation, e.g. the intensity must be less than e.g., 95% of the total dynamic range, to ensure the reliability. The blocks containing saturated pixels should be excluded from this calculation.

Since information obtained in step 510 is related with the whole picture frame, hereinafter this information may be called as frame information or statistics values. Step 512 indicates the end of the processes regarding step 500 in the FIG. 4.

Because the blocks containing saturated pixels are excluded from the frame information, the white balance gains obtained from this embodiment is robust against saturation. In one embodiment, it is assessed that whether or not a block is adjacent to the blocks which contain a saturated pixel. And such blocks are also excluded from the calculations to obtain the frame information in addition to the blocks containing saturated pixels. Such embodiment can further increase the robustness against the pixel saturation. In another embodiment, the blocks containing saturated pixels may be included from the frame information, but the number of saturated pixels in the individual block is taken into account. Such embodiment may be useful, for example, in the situation that there are too many such blocks and it would not be good to exclude so many blocks from the white balance calculation.

Figure 6:
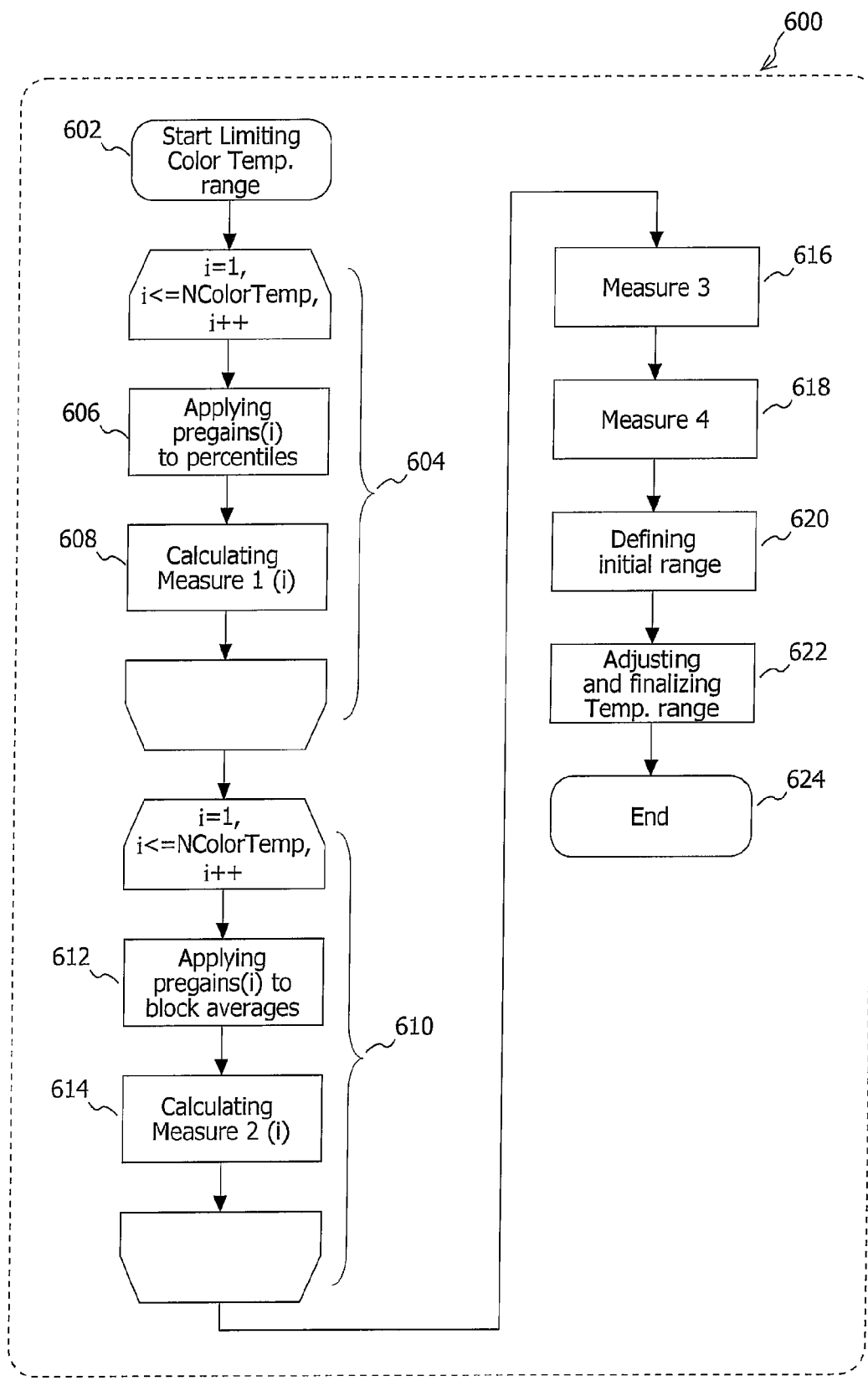
FIG. 6 is a flow chart for the processes included in step 600 illustrated in FIG. 4.

FIG. 6 illustrates the processes included in the step 600 of the FIG. 4. As mentioned above the step 600 includes the processes to decide the color temperature range that will be the basis of judging whether the blocks are likely to be grey or not. In another words, the step 600 narrows down the color temperature range which the AWB algorithm has to handle. This feature improves the AWB performance, especially in the case where the scene to be captured contains ambiguous target such as light blue color or light brown.

Step 602 indicates the start of the processes. The loop 604 is the process to calculate the first measure to decide the color temperature range. In the loop 604 a measure regarding a difference of histograms between the different color elements is calculated for each color temperature to be evaluated. For example, the color temperatures to be evaluated may be defined in each 500K between [2500K, 13000K], i.e., [2500K, 3000K, 3500K, 4000K, 4500K, 5000K, 5500K, 6000K, 6500K, 7000K, 7500K, 8000K, 9000K, 10000K, 11500K, 13000K]. For the higher color temperatures the bigger step sizes may be used as in this example, because the sensor response changes tend to become small in the higher color temperature area. Of course this is just an example definition. There can be a lot of variety of other definitions.

In step 606, pre-gains corresponding to the color temperature of the current loop are applied to the histogram percentiles calculated at step 510. Here the pre-gains means inverse values of the R/G and B/G sensor responses that have been measured in a standard environment. Therefore, in this step the respective R percentiles and the respective B percentiles are multiplied by the inverse values of the R/G and B/G sensor response at the current color temperature respectively.

Figure 9:
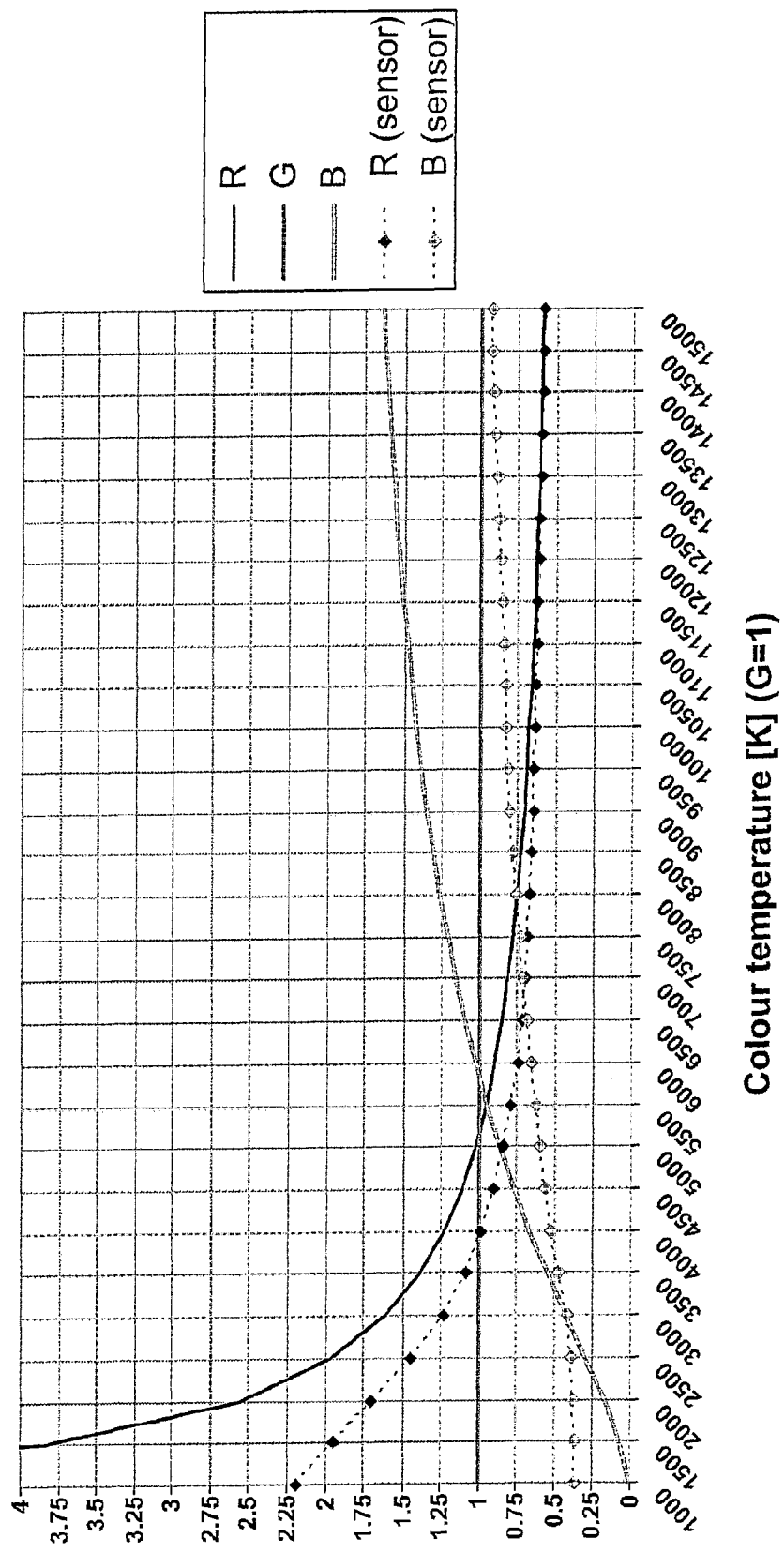
FIG. 9 illustrates response of an example image sensor and an ideal black body radiator, defined using CIE equal-energy illuminant, as a function of color temperature and given zero deviation from the Planck curve.

The R/G and B/G sensor responses with regard to the standard light source in different color temperatures must be measured in advance, and should be stored in the device, e.g., as a part of the firmware 42'. FIG. 9 shows the result of such measurement for an RGB image sensor which is available in the market. The results of measurements are plotted in each 500K in this figure. FIG. 9 also shows the normalized R and B spectrum of a black body radiator that is defined using CIE equal-energy illuminant and given zero deviation from the Planck curve. Black body radiator data may also be stored in the system, e.g., as a part of the firmware 42'. As it is known by those who skilled in the art, such calibration can be performed by using, for example, SimOne tent and Gretag MacBeth patch.

The inventor of the present applicant has discovered that if the color temperature of the current loop is close to the true color temperature of the scene, then the image data, to which said pre-gain have applied, should be white-balanced well, and therefore the difference between the maximum and the minimum pre-gained color component histogram percentile will become small at least for one of the percentiles.

Based on this observation, the inventor proposes to use the following measure for each color temperature to be evaluated.

$$\text{Measure\_1}(i) = \sum_{n=1}^{Npercentiles} \text{max\_min\_dif}(i, n) \quad (1)$$

$$\left(\text{max\_min\_dif}(n) = \frac{\max(pregain_{R(i)} \times R_{P(n)}, G_{P(n)}, pregain_{B(i)} \times B_{P(n)})}{\min(pregain_{R(i)} \times R_{P(n)}, G_{P(n)}, pregain_{B(i)} \times B_{P(n)})}\right)$$

where:
- $pregain_{R(i)}$: the pre-gain of the R component at the i-th color temperature
- $pregain_{B(i)}$: the pre-gain of the B component at the i-th color temperature
- $R_{P(n)}$: n-th percentile value of the R histogram
- $G_{P(n)}$: n-th percentile value of the G histogram
- $B_{P(n)}$: n-th percentile value of the B histogram
- $\max(pregain_{R(i)} \times R_{P(n)}, G_{P(n)}, pregain_{R(i)} \times B_{P(n)})$: maximum element of ($pregain_{R(i)} \times R_{P(n)}$, $G_{P(n)}$, $pregain_{R(i)} \times B_{P(n)}$)
- $\min(pregain_{R(i)} \times R_{P(n)}, G_{P(n)}, pregain_{R(i)} \times B_{P(n)})$: minimum element of ($pregain_{R(i)} \times R_{P(n)}$, $G_{P(n)}$, $pregain_{R(i)} \times B_{P(n)}$)
- i varies from 1 to the number of color temperatures to be evaluated.
- n varies from 1 to the number of percentiles to be calculated for a color component histogram.

The measure expressed in equation (1) will become small when the current color temperature in the loop is close to the true color temperature, because the difference between the maximum and the minimum pre-gained color component histogram percentile will become small at least for one of the percentiles if the white balance is good. And this measure may become large when the current color temperature in the loop is far from the true color temperature, because the difference between the maximum and the minimum pre-gained color component histogram percentile will become large if the white balance is not good. Therefore this measure can be used for detecting the true color temperature of the image scene.

In order to reduce the effect of possible large monochromatic objects, this measure may be modified as follows.

$$\text{Measured\_1}'(i) = \text{Measure\_1}(i) - 0.75 \times \max(\text{max\_min\_dif}(n)) \quad (1')$$

where:
max (max_min_dif(n)) is the maximum one of max_min_dif(1)~max_min_dif(N) (N: number of percentiles to be calculated for a color component histogram)

In the loop 604, the measure expressed in the equation (1) or (1') is calculated for the each color temperature to be evaluated at the step 608.

The loop 610 is the process to calculate the second measure to decide the color temperature range. The inventor has considered that, if the applied gains are close the correct white balance gains that correspond to the image, then for majority of image scenes there will be many separate colors present in the hue histogram as spikes. (Hue is the H component of HSV color space.) But if the applied gains are far from the ideal white balance gains, there may be strong spike in the red region or in the blue region, depending on whether the evaluated color temperature is too high or too low in comparison to the true color temperature of the image scene. Based on this observation, the inventor proposes to employ a score regarding the variance of the hue histogram of the image data to which the pre-gains have been applied. Like as the first measure, the second measure is also calculated for the each color temperature to be evaluated. Then the resulting scores are compared each other for detecting the true color temperature.

In step 612, pre-gains of the current color temperature in the loop 610 are applied to R and B block averages which have been calculated in step 508. As mentioned above and shown in FIG. 9, the pre-gains are inverse values of the R/G and B/G sensor responses under the standard light source illumination at the color temperature of the current loop position and must be measured in advance. The pre-gains are applied to all of the blocks which do not contain a saturated pixel.

In step 614, the hue histogram is created at the beginning, by applying sRGB (or other similar color conversion) conversion to the pre-gained RGB block averages in order to normalize the sensor color response, by applying RGB-to-HSV conversion to the normalized RGB values, and by accumulating the resulting hue values to the hue histogram. Then the score, i.e., the second measure is calculated in the following way: each bin value in the hue histogram is compared to the average bin count value of the histogram, and N is added to the score for each bin that has value higher than the average bin count value. N*bin_count/bin_count_average is added to the score for each bin that has value less than the average bin count value. "N" is the number and should be optimized for the concrete embodiments. The inventor has tested N=1000 and has obtained a good result. Also the number of bins should be optimized for the concrete embodiments. The inventor has tested the number of bins=32, and has obtained a good result.

In one embodiment, the mathematical variance of the hue histograms regarding the respective pre-gains of the different color temperatures may be employed as the second measure.

In one embodiment, the blocks that have too low or too high intensity value, as well as the blocks that have too low saturation value (S component of HSV), may be left out from the hue histogram in step 614 because hue may not be reliable measure in those conditions.

When the loop 610 finished, the second measures are calculated for all of the color temperatures to be evaluated.

In step 616, the third measure for deciding the color temperature range is obtained. The average R, G, and B values of the blocks that do not contain any saturated pixels, that have been calculated in step 510, may be employed as the third measure. And a color temperature which corresponds to the location on the Planck curve that is the closest to the RGB value of the third measure is also calculated.

In step 618, the fourth measure for deciding the color temperature range is obtained. The average R, G, and B values of the bright blocks, that have been calculated in step 510, may be employed as the fourth measure. And a color temperature which corresponds to the location on the Planck curve that is the closest to the RGB value of the fourth measure is also calculated.

In step 620, the initial color temperature range is defined by the color temperature which corresponds to the lowest first measure score and by the color temperature which corresponds to the highest second measure score. For example if the first measure indicates 6000K and the second measure indicates 5000K, then the initial range is defined as [5000K, 6000K].

If a lot of grey, too low intensity level of the image or too low variance in hue for all color temperatures was noticed with the second measure, then the average of the color temperatures indicated by the third and fourth measures are used instead of the result of the second measure. The situation where there is a lot of grey in the image scene can be detected because in such situation there may be large amount of blocks having low saturation value (S component of HSV) when the evaluated RGB gains are close to correct AWB gains.

Step 622 indicates the processes to perform fine tuning of the initial range obtained in the previous step. In the preferred embodiment the adjustment is performed in the following order:

- Limiting the operating range according to lighting level, which is detected according to used total exposure and the average signal level that resulted from that exposure. E.g. very bright illumination level can restrict the operating range to [3500K, 7500K] instead of the default e.g. [2500K, 15000K] range.
- Expanding the range to cover at least 1000K (for example [2500K, 3500K]), if both the first and the second measures indicate almost the same color temperature. First, expanding one step (500K) to the direction of the color temperature indicated by the third measure, then more steps to the direction of 5500K if necessary.
- Moving the range towards [5000K, 6000K] if the lighting level is sufficiently high.
- Restricting the range if more than 1500K range is covered. First, restricting one step (500K) according to averages of the color temperatures indicated by the third and fourth measures, then restricting towards 5500K.
- Applying special case restrictions (detected special cases (detection e.g. with neural networks that are trained to detect certain special cases that are known to be difficult for the first to the fourth measures), or manually selected AWB modes like "Daylight", "Tungsten" etc.)

It should be noted that above values are just examples. All values can vary depending on the concrete embodiments.

To decide the final intensity range from the first to fourth measures, it is also possible to use another heuristic method instead of the steps 620 and 622. For example, it is possible to employ a neural network which uses one or more of the first to fourth measures as the inputs (or may be other measures), and outputs the estimated the color temperature.

As the result of step 622 the operating color temperature range is finalized. As seen above, the final color temperature range is relatively narrow. This is quite advantageous to increase the AWB performance because of the following reason.

Many existing AWB algorithms have mistaken colors like e.g. light blue (part of blue sky, especially near hazy clouds) or light brown (part of light brown skin or sand) as being white. The reason is that e.g. light blue target under lower color temperature (e.g. ~5500K) illumination can make similar response in the sensor as white target under higher color temperature (e.g. ~10000K) illumination, and similarly light brown target under higher color temperature illumination can make similar response as white target under lower color temperature illumination. The existing solution is to fix the AWB operation range, e.g. 3500K-7000K. The obvious downside of this prior art solution is that such AWB algorithms do not give very good results in extreme color temperatures, like tungsten lighting or cloudy snow scenes etc.

However, the AWB algorithm regarding the Embodiment 2 limits the color temperature range to be handled adaptively, and quite narrowly, i.e. to the range inside which there is no ambiguity problem explained above. Therefore, the invented AWB algorithm in this patent application can provides stable AWB results in different lightning conditions. In this way the AWB performance is enhanced because of this limiting feature.

Step 624 indicates the end of the processes regarding the steps 600 of the FIG. 4.

Figure 7:
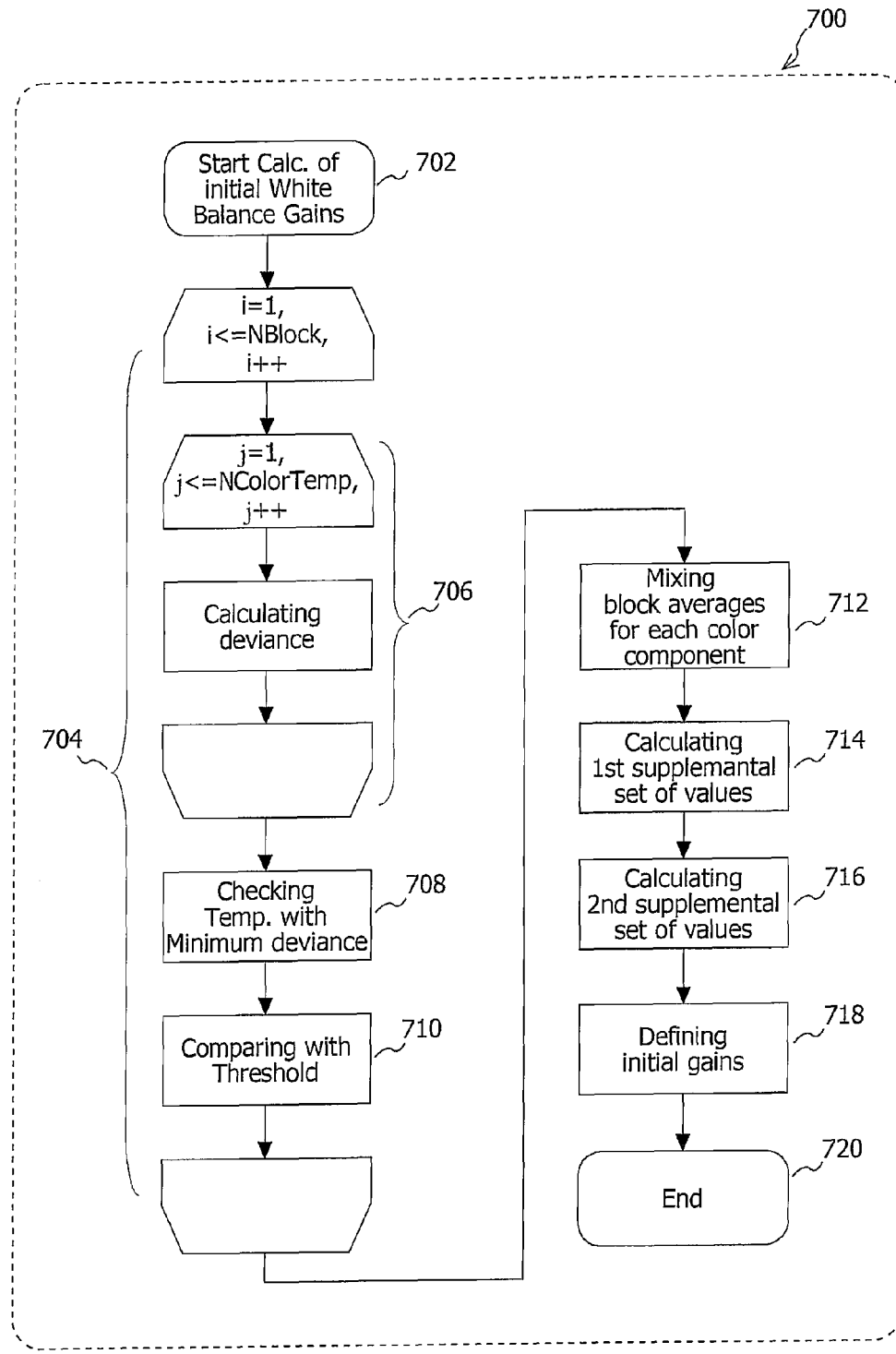
FIG. 7 is a flow chart for the processes included in step 700 illustrated in FIG. 4.

FIG. 7 illustrates the processes included in step 700 of the FIG. 4. As mentioned earlier step 700 indicates the processes for finding blocks that are likely to be grey and calculating initial white balance gains based on those reference grey blocks.

Step 702 indicates the start of the processes. Loop 704 indicates that the color judgement is performed for all blocks individually. However, preferably the blocks containing a saturated pixel may be excluded from the color judgement to improve the robustness against the pixel saturation.

In loop 706, a deviance between the respective RGB averages in the current block and the RGB sensor responses for the standard source at the current color temperature is calculated. As mentioned before, the respective RGB averages have been calculated in step 508 and the RGB sensor responses for the standard source in different color temperatures are stored in e.g., firmware 42'. The deviance is calculated for the each color temperature where the sensor response data exists and between the range decided in the steps 600. For example, if the steps 600 have decided the color temperature range is [5000K, 6000K] and the sensor characterization has been performed for each 500K, the deviances are calculated for 5000K, 5500K, and 6000K. The deviance may be calculated by comparing R/G and B/G between the block averages and the characterization data (i.e., sensor responses in a standard environment). If the deviance is small, the color of the block can be deemed as grey.

In step 708, it is checked that in which color temperature does the deviance become the smallest. And in step 710 the smallest deviance is compared with the predetermined threshold. In one embodiment, the algorithm defines three likelihood areas for the difference of (R/G, B/G); +/−3% as the highest likelihood range, +/−5% as the middle likelihood range, and +/−10% as the lowest acceptable range. As the result of step 710 each block is registered to one of the four categories (+/−3/5/10% or not grey) according to the color temperature (5000K, 5500K or 6000K in this case) that gives the highest likelihood.

Of course those thresholds are just examples and various kinds of thresholds can be employed. For example, if it is known that the sensor response varies in certain range depending on the individual sensor, which may be caused by the variation in the color filter responses, the limits exampled above may be widened accordingly. Also, it may be desirable to take different illumination sources, whose light is known to be far outside the Planck curve, into account when determining the limits for R/G and B/G for each color temperature between e.g. [1000K, 15000K] in e.g. 500K steps.

After the loop 704 completed, all blocks are categorized into those four categories. It should be noted that the above criteria is just an example and can be defined in a variety of ways according to the sensor characteristics, preference of the manufactures or the users, and so on.

In step 712, the weighed averages of the R, G, and B block values are created from the blocks judged as grey (i.e., the deviance is less than 10% in case of the above example.) The block values of the blocks having higher likelihood are weighted more in the calculation of the weighted averages. If a lot of high likelihood grey blocks has been found, then the weight for the lower likelihood grey blocks may be 0, i.e., such block may not be included in the mixed values. In one embodiment, the intensity of the block may also be considered in the weighted averages. The block values of the higher-intensity blocks may be more weighed than the values of the lower-intensity blocks. The resulting R, G, and B values of step 712 will be the basis of the final white balance gains.

Step 714 and 716 are the steps for calculating supplemental values for obtaining the white balance gains. Step 714 calculates the first set of supplemental values. This is a set of RGB values or (R/G, B/G) values corresponding to a location on the Plank curve that has the shortest distance from the following two location on the Plank curve; the one is a location corresponding to the central color temperature in the range determined in the steps 600, and the other is a location corresponding to the average R, G, and B values of all of the blocks that do not contain any saturated pixels (which has been obtained in step 510). R/G and B/G values corresponding to a location on the Plank curve can be obtained from the spectral response measurement of the sensor.

Step 716 calculates the second set of supplemental values. This is a set of RGB values or (R/G, B/G) values corresponding to a location on the Plank curve that has the shortest distance from the location corresponding to the weighed RGB average values obtained in step 712.

In step 718 the initial white balance gains are decided from the three set of values obtained from the step 712 to 716. In case that a lot of grey blocks have been found in the steps 600, then preferably the values regarding step 712 should be dominant in the resulting gains of this step. If very little or no grey block has been found in the steps 600 then the values regarding step 714 and 716 should be dominant in the resulting gains. The weighing factors may vary adaptively depending on the number of blocks regarded as grey in the steps 600. The resulting values in step 718 are regarded as the initial candidates of the white balance gains. In one embodiment those resulting values can be used as the final white balance gains, although the embodiment described here has further processes indicated by the step 800. Step 720 indicates the end of processes regarding the steps 700.

Many existing AWB algorithm lose the robustness when there is very little or no reference grey in the image scene (i.e. no white/grey objects etc.), and grey-world score is not high either. However, since the invented AWB algorithm decides the white balance gains not only from the blocks judged as grey but also from above-explained two measures, it can provide robust AWB results even in such extreme conditions. Thus it can be understood that the feature of deciding the AWB gains from those measures increases the AWB performance.

Figure 8:
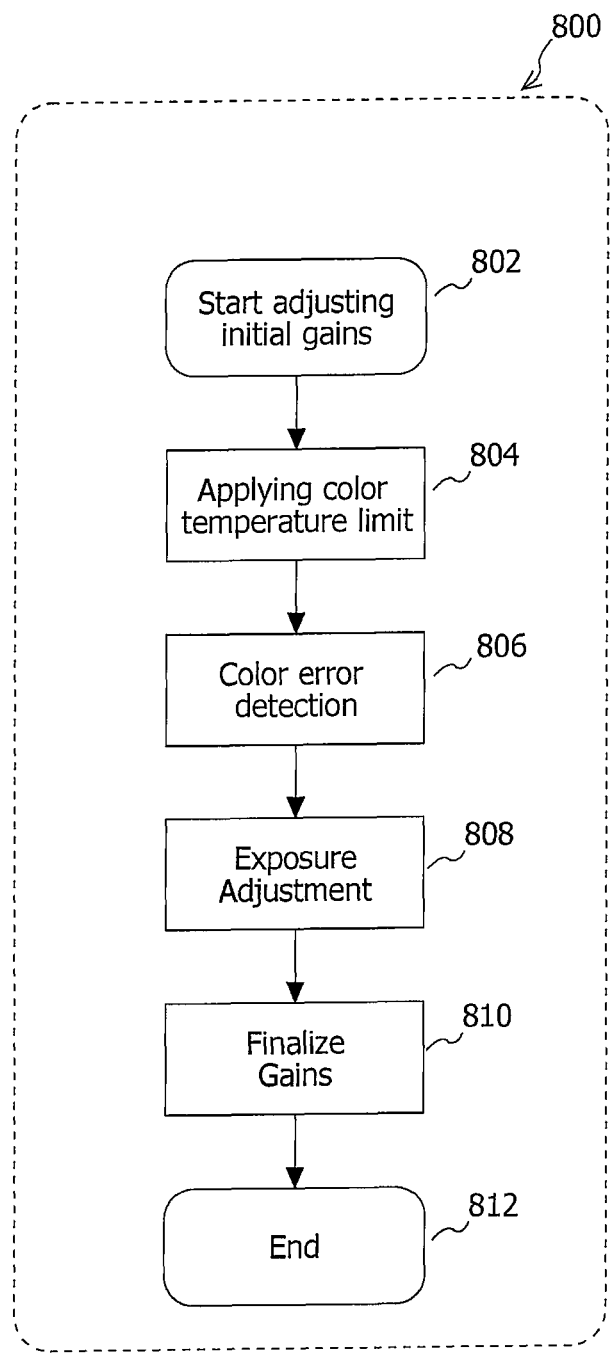
FIG. 8 is a flow chart for the processes included in step 800 illustrated in FIG. 4.

FIG. 8 illustrates the processes included in step 800 of the FIG. 4. As mentioned earlier step 800 indicates the processes for tuning initial white balance gains by certain criteria to provide ideal white balance gains.

Step 802 indicates the start of processes regarding the step 800. In step 804 the RGB values resulted from the steps 700 will be adjusted if those values would correspond to color temperatures that are outside the certain limits.

Step 806 indicates a step for detecting possible color errors. If some color component is very strong in comparison to other color components, e.g. in the histogram percentile at which the difference between R, G and B is the smallest, and that has been gained according to initial white balance gains obtained from the steps 700, then the difference is reduced adaptively, for example by maximum of 10%. That is, if the difference is above some threshold, then maximum correction is applied, otherwise the correction reduces linearly towards lower threshold until it becomes zero at the lower threshold.

In step 808, additional digital gain is calculated to compensate for underexposure if necessary. In step 810, the final white balance gains are decided according to the adjustments performed in steps 804-808. Because of those adjustments the final white balance gains can be more robust against the possible errors. Step 812 indicates the end of processes regarding step 800.

Various modifications can be made for the above-explained embodiment. For example, it is possible to arrange the system or algorithm such that if some special AWB mode like e.g. "Daylight" or "Tungsten" is selected from a user then it will have corresponding effect on the color temperature limits in the steps 600 and/or the steps 800.

The AWB algorithm according to the present invention, of course including Embodiment 1 & 2, can be employed to any imaging devices such as digital still cameras, digital video cameras, and mobile devices having camera or video functions like as imaging phones. And the AWB algorithm according to the present invention can be implemented partly by hardware and party by software as described here, but also can be implemented fully by software processing. Therefore the present invention includes computer programs which perform the above explained AWB algorithms on personal computers, mobile devices, servers, or any computer devices.

Whilst endeavoring in the foregoing specification to draw attention to those features of the invention believed to be of particular importance, it should be understood that the applicant claims protection in respect of any patentable feature of combination of features hereinbefore referred to and/or shown in the drawings whether of not particular emphasis has been placed thereon.

The invention claimed is:

1. An apparatus, comprising circuitry, wherein the circuitry is configured to:
   divide a frame of image data comprising red, green and blue color elements into a plurality of blocks including a plurality of pixel data;
   define a plurality of intensity ranges for the plurality of pixel data in a block, in which the intensity ranges are different with each other;
   judge, for each of the intensity ranges, whether the blocks are likely to be grey in the intensity range and to cumulate average values of colors of the blocks judged as being likely to be grey in the intensity range for the respective color elements where criteria for grey judgment are different for each intensity range and use the red, green and blue color elements;
   provide, for each of the red, green and blue color elements, variable weightings to the cumulated values for the different intensity ranges, and to mix the variably weighted cumulated values, and;
   decide the gains for adjusting a white balance based on the mixed variably weighted cumulated values for the respective red, green and blue color elements.

2. An apparatus according to claim 1, comprising circuitry configured to check each of all of or a part of the blocks whether the block contains a saturated pixel or not, and to exclude the block containing a saturated pixel from calculations for deciding the gains for adjusting a white balance.

3. An apparatus according to claim 2, comprising circuitry configured to check each of all of or a part of the blocks whether the block is adjacent to the block containing a saturated pixel or not, and to exclude the block adjacent to the block containing a saturated pixel from calculations for deciding the gains for adjusting a white balance.

4. An apparatus according to claim 1, where the judgment whether the block is likely to be grey or not is contingent on whether one, or more of B/G, R/G, min(R,B)/G, and max(R, B)/G satisfy given criteria or not, where:
   R represents an average value of the red data in the block to be judged, G represents an average value of the green data in the block to be judged, B represents an average value of the blue data in the block to be judged, min(R,B)/G represents a value dividing a smaller one of the R and the B by the G, max(R,B)/G represents a value dividing a larger one of the R and the B by the G.

5. An apparatus according to claim 4, where the criteria are decided based on one or more of histograms of the respective color elements and luminance of the whole frame, and average values of the respective color elements of the whole frame.

6. An apparatus according to claim 4, where calculations for deciding the criteria do not use the block containing a saturated pixel and/or the block adjacent to the block containing a saturated pixel.

7. An apparatus according to claim 1, comprising circuitry configured to apply weighting to an average value of the color element in the block judged as being likely to be grey with higher probability, and/or an average value of the color element in the block having higher intensity.

8. An apparatus according to claim 1, comprising circuitry configured to apply weighting for the mixing based on the numbers of blocks judged as being likely to be grey in the respective intensity ranges, and/or representative intensity values of the respective intensity ranges.

9. An apparatus according to claim 1, comprising circuitry configured to calculate average values of the respective color elements from the blocks that do not contain any saturated pixels and/or the blocks that are not adjacent to the blocks containing a saturated pixel, and to decide the gains for adjusting a white balance by taking those average values into account.

10. An apparatus according to claim 1, comprising circuitry configured to define one, or more color temperatures for the grey judgment, and circuitry configured to judge whether the block is likely to be grey or not in the defined color temperatures.

11. An apparatus according to claim 10, where the color temperatures are defined based on one or more of following measures: a measure regarding a difference of histograms between the different color elements, a measure regarding a variance of a hue histogram, a measure regarding averages of the respective color elements obtained from the blocks that do not contain any saturated pixels, and a measure regarding averages of the respective color elements obtained from the blocks having larger intensity.

12. An apparatus according to claim 10, where the apparatus comprises a memory storing characteristic data regarding the spectral response of a sensor of the apparatus with regard to a standard light source, and the apparatus comprises circuitry configured to calculate, for each of the blocks, a deviance between the characteristic data at the defined color temperature and averages values of the respective color elements in the block, and circuitry configured to judge that the block is likely to be grey when the deviance is less than a predetermined value.

13. An apparatus according to claim 10, comprising:

circuitry configured to calculate a first set of average values, the first set of average values is a set of average values of the color components in the blocks judged as being likely to be grey, and;

circuitry configured to decide the gains for adjusting a white balance based on the first set of average values.

14. An apparatus according to claim 13, comprising circuitry configured to apply weighting for the calculation of the first set of average values based on the deviance and/or intensity with regard to the blocks.

15. An apparatus according to claim 13, comprising, circuitry configured to take a first set of supplemental values into account in the decision of the gains for adjusting a white balance; the first set of supplemental values is a set of values regarding the color elements corresponding to a location on the Plank curve that has the shortest distance from a location corresponding to the defined color temperature and a location corresponding to a second set of average values; the second set of average values is a set of average values of the respective color components of the blocks that do not contain any saturated pixels and/or the blocks that are not adjacent to the block containing a saturated pixel.

16. An apparatus according to claim 13, comprising circuitry configured to take a second set of supplemental values into account in the decision of the gains for adjusting a white balance; the second set of supplemental values are values regarding the color elements corresponding to a location on the Plank curve that has the shortest distance from a location corresponding to the first set of averages.

17. An apparatus according to claim 1, wherein the plurality of intensity ranges comprise at least two overlapping intensity ranges.

18. An apparatus according to claim 1, wherein at least a portion of the circuitry is provided by, a CPU.

19. An apparatus comprising:

a block extractor configured to:

divide a frame of image data comprising red, green and blue color elements into a plurality of blocks including a plurality of pixel data; and an automatic white balance analyzer configured to:

define a plurality of intensity ranges for the plurality of pixel data in a block, in which the intensity ranges are different with each other;

judge, for each of the intensity ranges, whether the blocks are likely to be grey in the intensity range and to cumulate average values of colors of the blocks judged as being likely to be grey in the intensity range for the respective color elements where criteria for grey judgment are different for each intensity range and use the red, green and blue color elements;

provide, for each of the red, green and blue color elements, variable weightings to the cumulated values for the different intensity ranges, and to mix the variably weighted cumulated values, and;

decide the gains for adjusting a white balance based on the mixed variably weighted cumulated values for the respective red, green and blue color elements.

20. An apparatus according to claim 19 wherein the automatic white balance analyzer is configured to check each of all of or a part of the blocks whether the block contains a saturated pixel or not, and to exclude the block containing a saturated pixel from calculations for deciding the gains for adjusting a white balance.

21. An apparatus according to claim 19 wherein the automatic white balance analyzer is configured to define one or more color temperatures for the grey judgment, and configured to judge whether the block is likely to be grey or not in the defined color temperatures.

22. A method, performed at an apparatus, comprising:

dividing a frame of image data including red, green and blue color elements into a plurality of blocks including a plurality of pixel data;

defining a plurality of intensity ranges for the plurality of pixel data in a block, in which the intensity ranges are different with each other;

for each of the intensity ranges, judging whether the blocks are likely to be grey in the intensity range and cumulating average values of colors of the blocks judged as being likely to be grey in the intensity range for the respective color elements where criteria for grey judgment are different for each intensity range and use the red, green and blue color elements;

for each of the red, green and blue color elements, providing variable weightings to the cumulated values for the different intensity ranges, and mixing the variably weighted cumulated values, and;

deciding the gains for adjusting a white balance based on the mixed variably weighted cumulated values for the respective red, green and blue color elements.

23. A method, performed at an apparatus, according to claim 22 further comprising checking each of all of or a part of the blocks whether the block contains a saturated pixel or not, and excluding the block containing a saturated pixel from calculations for deciding the gains for adjusting a white balance.

24. A non-transitory physical entity embodying a computer program comprising computer program instruction that, when executed by at least one processor, enable an apparatus to perform:

dividing a frame of image data including red, green and blue color elements into a plurality of blocks including a plurality of pixel data;

defining a plurality of intensity ranges for the plurality of pixel data in a block, in which the intensity ranges are different with each other;

for each of the intensity ranges, judging whether the blocks are likely to be grey in the intensity range and cumulating average values of colors of the blocks judged as being likely to be grey in the intensity range for the respective color elements where criteria for grey judgment are different for each intensity range and use the red, green and blue color elements;

for each of the red, green and blue color elements, providing variable weightings to the cumulated values for the different intensity ranges, and mixing the variably weighted cumulated values, and;

deciding the gains for adjusting a white balance based on the mixed variably weighted cumulated values for the respective red, green and blue color elements.

25. A non-transitory physical entity according to claim 24 wherein the computer program instructions further enable the apparatus to check each of all of or a part of the blocks whether the block contains a saturated pixel or not, and to exclude the block containing a saturated pixel from calculations for deciding the gains for adjusting a white balance.

* * * * *